Oct. 6, 1931.  B. D. CHAMBERLIN  1,826,299
PHOTOGRAPHIC CAMERA
Original Filed Jan. 29, 1921   3 Sheets-Sheet 1

INVENTOR
Benjamin D. Chamberlin
BY
ATTORNEYS.

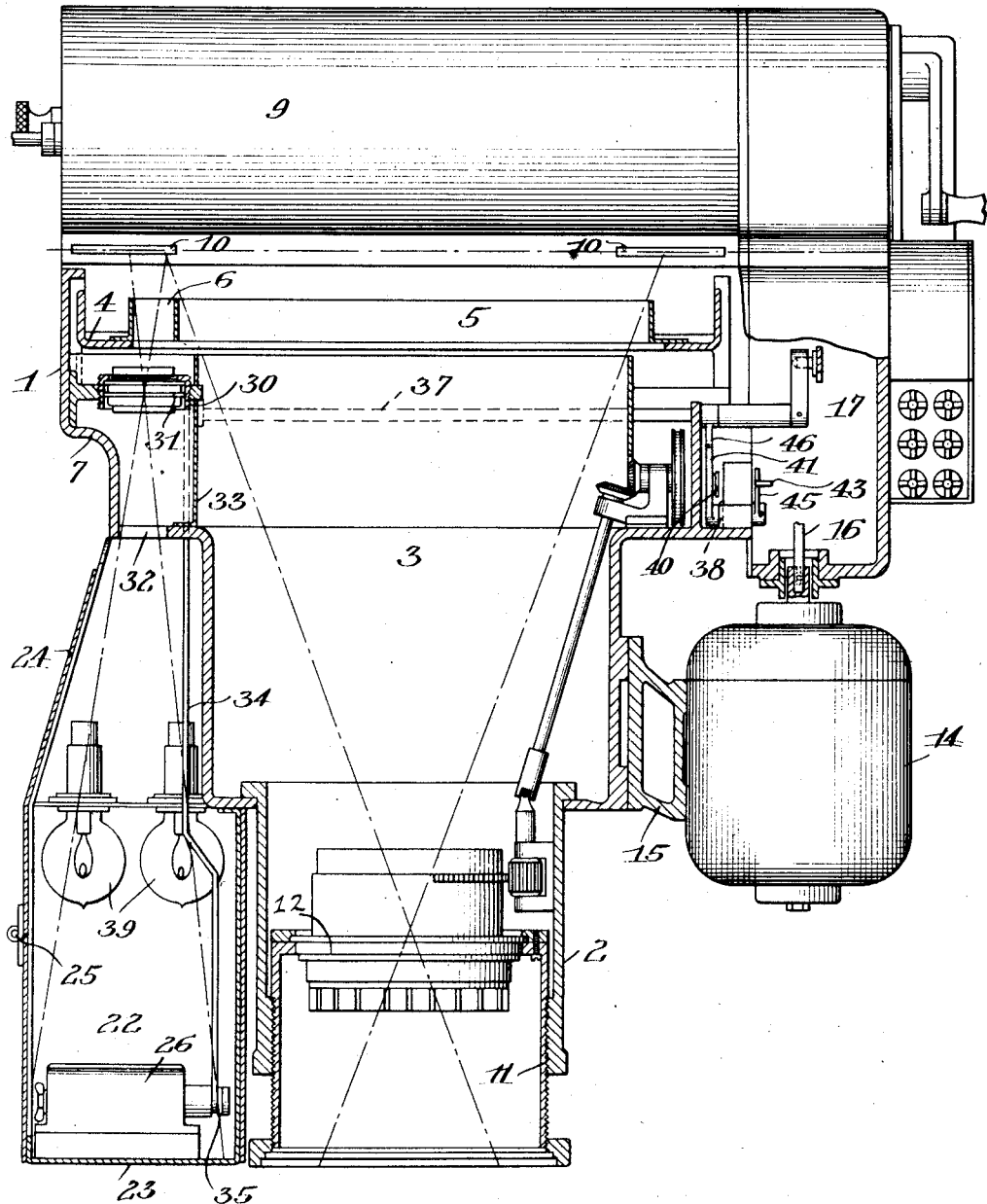

Oct. 6, 1931.   B. D. CHAMBERLIN   1,826,299
PHOTOGRAPHIC CAMERA
Original Filed Jan. 29, 1921   3 Sheets-Sheet 3
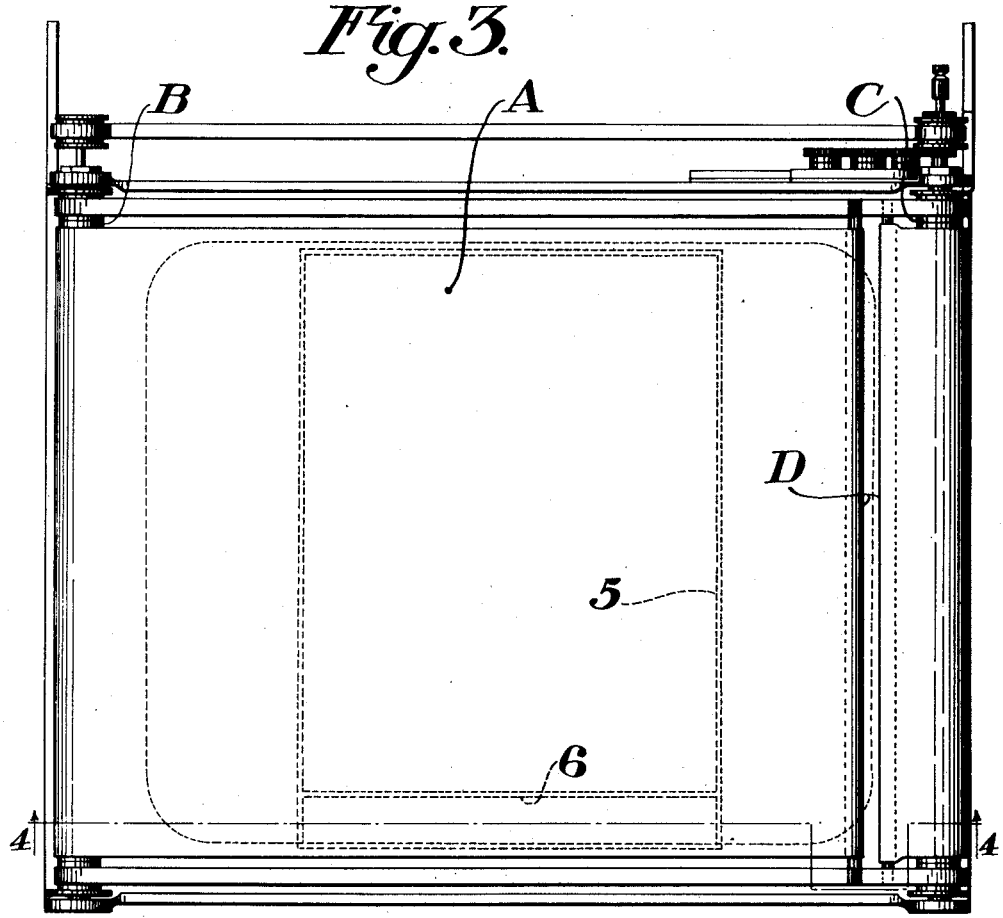
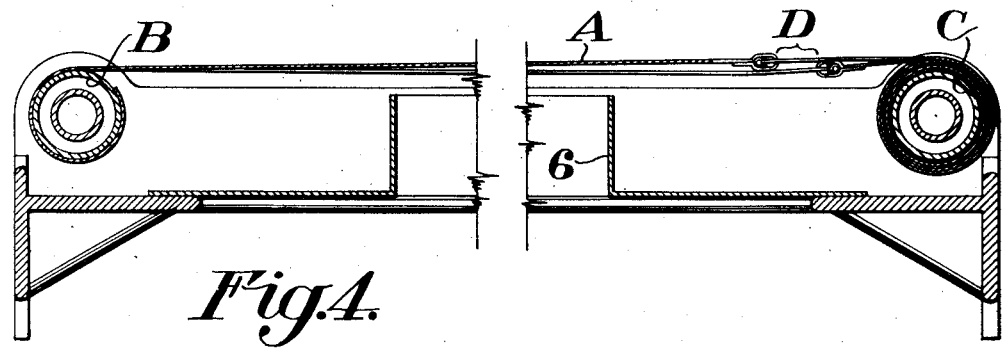
Inventor,
Benjamin D. Chamberlin,
By
Attorneys Patented Oct. 6, 1931

1,826,299

UNITED STATES PATENT OFFICE

BENJAMIN D. CHAMBERLIN, OF ROCHESTER, NEW YORK, ASSIGNOR TO EASTMAN KODAK COMPANY, OF ROCHESTER, NEW YORK, A CORPORATION OF NEW YORK

PHOTOGRAPHIC CAMERA

Original application filed January 29, 1921, Serial No. 440,908. Divided and this application filed January 22, 1929. Serial No. 334,180.

My present invention relates to photography and it has for its object to provide an improved photographic camera particularly adapted for aerial work which will be provided with means for recording upon the film or picture margin a reading of conditions under which the exposure was made. The improvements are further directed toward embodying such a feature in an automatic camera that takes successive pictures during flight through mechanism that successively actuates various mechanisms to carry out the required sequence of operations such as feeding film, winding and actuating a shutter, etc. To these and other ends the invention resides in certain improvements and combinations of parts all as will be hereinafter more fully described, the novel features being pointed out in the claims at the end of the specification.

In the drawings:

Figure 2 is a central section on Figure 1 taken on the line 1—1.

Fig. 3 is a top plan view showing the curtain shutter removed from the camera casing.

Fig. 4 is a section on line 4—4 of Fig. 3.

Similar reference numerals throughout the several views indicate the same parts.

Figure 1:
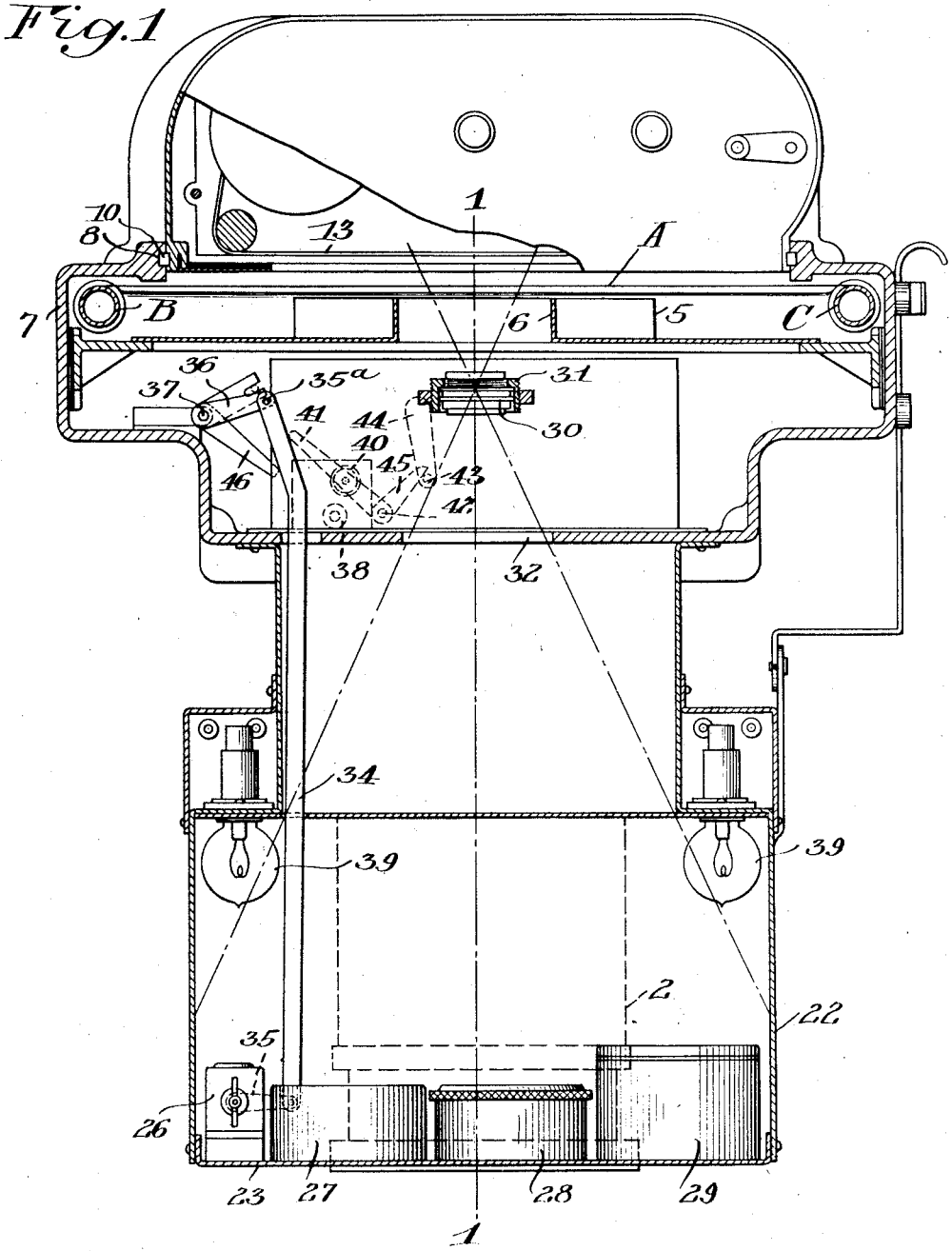
Figure 1 is a vertical section through the dark chamber of the exposure identification equipment of a camera constructed in accordance with and illustrating one embodiment of my invention.

This application is a division of my prior co-pending application, Serial Number 440,908 filed January 29, 1921, which has now matured into Patent No. 1,764,066, issued June 17, 1930, in which is disclosed the entire automatic camera of which the present exposure identification means constitutes a part. To first give a general idea of the structure involved and its accomplishments I provide a camera body disposed, in aerial work, with its optical axis vertical and fitted at the top with a detachable light tight roll holder. The camera body includes a dark chamber containing a number of instruments the readings of which at the time of taking an exposure are valuable in connection with a later reading of the photograph itself. These instruments are photographed at the same time as the latter through a separate lens but by the use of a single focal plane curtain shutter. These instruments are photographed on the margin of the picture, the dark chamber being artificially illuminated electrically in timed relation to the movement of the shutter. These and other operations, properly synchronized, are effected through a unitary driving and controlling mechanism preferably embodying a motive power operating continually with uniform speeds through mechanism that may be set to automatically repeat and make successive exposures at regular intervals. This becomes necessary in mapping a country over which a flight is being made so that one picture will commence where the other leaves off and when joined together will give a complete record of the continuity of the ground beneath. As before stated, the present invention has to do with marking on the film information such as altitude and direction at the time of taking which are useful in thus making up and identifying the parts of a complete record of a trip.

Referring more particularly to the drawings, 1 indicates the main casing of the camera body having a tubular extension 2 at the bottom thereof and forming a main exposure chamber 3 at the top of which is a frame 4 provided with a main exposure opening 5 and a small auxiliary exposure opening 6 distinct therefrom. The upper enlarged portion 7 of the frame 1 is fitted, as shown in Figure 1, with ways 8 to receive a slidably detachable roll holder 9 having guides 10 fitting the ways 8. Below the roll holder and above the exposure openings 5 and 6 is stretched the focal plane curtain shutter having an adjustable aperture D, said shutter indicated generally at A in Figure 1 and supported on the winding rolls B and C this structure is fully described in my Patent No. 1,764,066 above referred to and is specifically described in detail in Patent No. 1,492,357, issued April 29, 1924 for photographic shutter. This patent resulted from an application which was a division of my parent application resulting in Patent No. 1,764,066. The lower tubular extension 2 of the main casing 1 has threaded therein an adjustable lens tube 11 carrying the main lens mount 12 of the camera.

Associated with the main casing 1 and adjacent to but separated from the exposure chamber 3 of the camera is a dark chamber 22 formed by a box or chest 23 secured to the exterior of the casing. The interior of the dark chamber is accessible through a door 24 hinged at 25 and at the bottom of the chamber are located a plurality of instruments 26, 27, 28, and 29, the readings of which, at the time of an exposure, are of interest in viewing the picture itself and which it is therefore desired to photograph on a margin thereof. In the present instance, 26 is a counter; 27 a spirit level; 28 an altimeter, and 29 a compass, though a chronometer may be added to or substituted for one of these. The instruments are in the focus of a separate short focus lens carried in a tube 30 and mounting 31 at the top of the dark chamber 22 where the latter is extended through an opening 32 in the shoulder of the main casing 1 and separated from the exposure chamber 3 of the main camera by a partition 33. The lens 31 projects the image of the instruments through the exposure opening 6 onto the same film 13 as that projected by the main lens 12 and under control of the same shutter A.

Upon each cycle of operation of the camera, the counter 26 is actuated and advanced one number by a vertical pull rod 34 pivoted to an operating arm at 35 and effective upon its upward movement. The upper end of the pull rod is pivoted at 35a to an arm 36 on a rock shaft 37. Adjacent to the latter is the contact 38 of a switch in the circuit of one or more electric lamps 39 arranged in the dark chamber 22 to illuminate the instruments 26, 27, 28 and 29. Another contact member 40 on a rock arm 41 pivoted at 42 is adapted to engage contact 38 and close the circuit through the lamps as a preliminary step in each cycle of operation of the camera. This is accomplished by a pin 43 on a rock arm 44 that engages an extension 45 on the rock arm 41, the rock arm 44 being moved by the driving and controlling mechanism of the camera including motor 14 supported by a bracket 15 on the case 1 and having a vertical shaft 16 extending into a gear case 17 that houses the automatic mechanism of the camera and with which the shaft of arm 44 connects. This complicated mechanism is not set forth herein because it forms the subject matter of my said parent application.

This rock arm 44 returns to the initial dotted line position of Figure 1 immediately after throwing the switch and at the end of the cycle of operations of the camera, the rock shaft 37 which also extends into the case 17 is actuated in turn actuating counter 26 through the pull rod 34. In accomplishing this latter function, another rock arm 46 on the shaft 37 engages and returns the contact arm 41, opening the switch and putting out the lamp 39. The contact arm 41 is burdened with sufficient frictional resistance to its movement to remain in any position to which it is rotated.

The sequence of operations of the automatic operating mechanism is such that the shutter mechanism is first tripped; the film is wound off; the shutter is rewound and then the counter 26 is actuated. It should be noted that illumination by lamps 39 is controlled by the mentioned automatic cycle mechanism while the duration of exposure of the main shutter is determined by the adjustable aperture therein, which aperture is adjustable independently of the automatic cycle member.

I claim as my invention:

1. In an aerial camera, the combination with a camera body having a lens, a separate dark chamber adjacent to said body and a lens in the dark chamber, of a registering instrument in the latter in the focus of the chamber lens, means for feeding sensitive material into position for exposure to light from both lenses, a shutter normally protecting the sensitive material and means for periodically lighting the dark chamber in timed relation to actuations of the shutter.

2. In an aerial camera, the combination with a camera body having a lens, a separate dark chamber adjacent to said body and a lens in the dark chamber, of a registering instrument in the latter in the focus of the chamber lens, means for feeding sensitive material into position for exposure to light from both lenses, a shutter normally protecting the sensitive material, means including an electric circuit and a switch for lighting the dark chamber and driving mechanism controlling the shutter and feeding means and adapted to periodically operate the switch in timed relation thereto.

3. In an aerial camera, the combination with a camera body having a lens, a separate dark chamber adjacent to said body and a lens in the dark chamber, of a counter in the latter in the focus of the chamber lens, means for disposing the same sensitive element for exposure to light from both lenses, a shutter normally protecting the sensitive material, means including an electric circuit and a switch for periodically lighting the dark chamber with relation to the movements of the shutter and means for actuating the counter, said means being also adapted to actuate the switch.

4. In an aerial camera, a camera body having a lens, a separate dark chamber adjacent said body, a lens in said chamber, a registering instrument in said chamber at the focus of the lens therein, means for mounting a light sensitive film for exposure through both of said lenses, a shutter device for controlling the exposure of said film through both of said lenses, means for illuminating said instrument, and common operating means for controlling the effectiveness of the illuminating means and the shutter in a definite desired cycle relation to one another.

5. In an aerial camera, a device for recording information on a sensitized surface within said camera including a counter having a number indication, a lens for throwing an image of the number indication onto said sensitized surface, means for illuminating the number indication, and a common means for operating said counter and controlling said illuminating means.

6. In an aerial camera, a main lens for throwing an image on a sensitized surface within said camera, an auxiliary lens for throwing the image of a group of indicating instruments onto said sensitized surface within the field covered by said main lens, and a funnel member between the auxiliary lens and the sensitized surface for confining the image formed by the auxiliary lens on the sensitized surface to the indicating faces of said instruments.

7. In an aerial camera having a main lens and shutter, a device for recording information on a sensitized surface within said camera including an indicating instrument, a lens for throwing an image of the indication of said instrument upon the sensitized surface, means for illuminating the indicating portion of said instrument to impress the image thereof on the sensitized surface, and means for controlling the duration of illumination independently of the duration of exposure by the main shutter whereby correct exposure of the indication portion of said indicating instrument is possible under varying external light conditions.

Signed at Rochester, New York, this 17th day of January, 1929.

BENJAMIN D. CHAMBERLIN.